(12) United States Patent
Whitley

(10) Patent No.: US 9,039,056 B2
(45) Date of Patent: May 26, 2015

(54) CLAMP FOR A TENSILE IMPLEMENT AND METHOD OF CLAMPING A TENSILE IMPLEMENT

(71) Applicant: Highwall Mining Innovations, LLC, Summersville, WV (US)

(72) Inventor: Ralph Whitley, Huntersville, NC (US)

(73) Assignee: Highwall Mining Innovations, LLC, Summersville, WV (US)

( * ) Notice: Subject to any disclaimer, the term of this patent is extended or adjusted under 35 U.S.C. 154(b) by 0 days.

(21) Appl. No.: 13/958,753

(22) Filed: Aug. 5, 2013

(65) Prior Publication Data

US 2014/0259542 A1    Sep. 18, 2014

Related U.S. Application Data

(63) Continuation-in-part of application No. 13/841,090, filed on Mar. 15, 2013.

(51) Int. Cl.
*B66C 1/42* (2006.01)
*F16G 11/04* (2006.01)

(52) U.S. Cl.
CPC ............ *F16G 11/048* (2013.01); *Y10T 24/3969* (2015.01); *Y10T 29/49826* (2015.01)

(58) Field of Classification Search
CPC ......... F16G 11/04; F16G 11/00; F16G 11/10; F16G 11/12; F16G 11/046; F16G 11/48; E21B 19/07; E21B 19/06; E21B 19/10; B66C 1/48; E04C 5/122; F16B 2/14; C08L 2666/02; C08L 2666/24; C08L 51/006; C08L 53/02; E05Y 2900/148; E06B 9/324; Y10T 24/3969; Y10T 29/49826

USPC .......... 294/102.1; 403/374.1, 374.2, 275, 16, 403/211; 24/136 R, 115 M, 132 R, 132 WL; 16/205

See application file for complete search history.

(56) References Cited

U.S. PATENT DOCUMENTS

| | | | | |
|---|---|---|---|---|
| 482,975 | A | * | 9/1892 | Cope ........................... 24/136 R |
| 1,390,830 | A | | 9/1921 | Snow |
| 1,647,398 | A | | 11/1927 | Draheim |

(Continued)

FOREIGN PATENT DOCUMENTS

WO         WO8806118         8/1988

OTHER PUBLICATIONS

Instron, Hydraulic Wedge-Action Grips, 2010, pp. 1-3, Illinois Tool Works, Inc., IL, USA.

(Continued)

*Primary Examiner* — Stephen Vu
(74) *Attorney, Agent, or Firm* — Myers Bigel Sibley & Sajovec, PA

(57) ABSTRACT

A clamp for a tensile implement and method of clamping a tensile implement is disclosed. The clamp is portable and adaptable to different sizes of tensile implements. The clamp includes a cavity defined by side surfaces of a pair of blocks which are attached to a top surface of a grip base. A pair of mated reciprocal wedges, selected based on size of the tensile implement from a plurality of pairs of wedges, fits and slides within the cavity in order to grip the tensile implement. Each one of the wedges has a planar surface for sliding and a semi-cylindrical void which forms a cylindrical void through which the tensile implement passes when fully clamped around the tensile implement.

20 Claims, 21 Drawing Sheets

(56) References Cited

U.S. PATENT DOCUMENTS

| | | | |
|---|---|---|---|
| 2,970,444 A | 2/1961 | Hewton | |
| 3,335,470 A * | 8/1967 | Baer | 403/211 |
| 3,351,986 A * | 11/1967 | Johnson | 403/369 |
| 3,776,586 A | 12/1973 | Ahlgren et al. | |
| 3,816,012 A | 6/1974 | Hubbell | |
| 3,905,711 A * | 9/1975 | Rogers | 403/16 |
| 4,869,358 A | 9/1989 | Chandler | |
| 4,898,496 A | 2/1990 | Pfeiffer et al. | |
| 5,582,465 A | 12/1996 | Mraz | |
| 6,076,236 A * | 6/2000 | DeFrance | 24/136 R |
| 6,109,699 A | 8/2000 | Mraz | |
| 6,777,903 B1 * | 8/2004 | Ostwald | 318/568.21 |
| 7,594,702 B2 | 9/2009 | Lowery | |
| 2006/0038438 A1 | 2/2006 | Mraz | |

OTHER PUBLICATIONS

Www.instron.us, Tensile and Bend Testing of High Strength Rebar (Reinforcement Bar), 2013, p. 1, Illinois Tool Works, Inc., IL, USA.

* cited by examiner

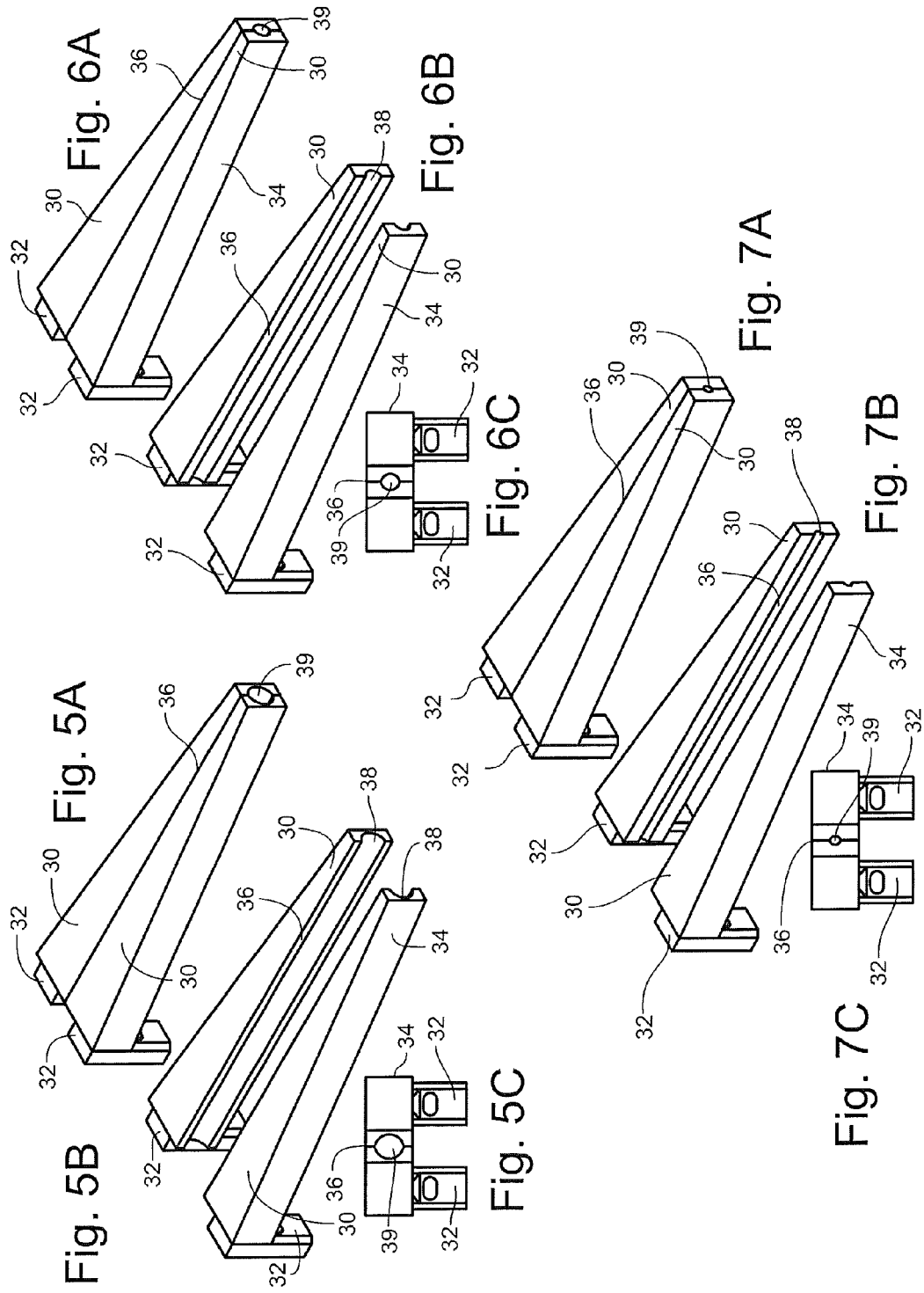

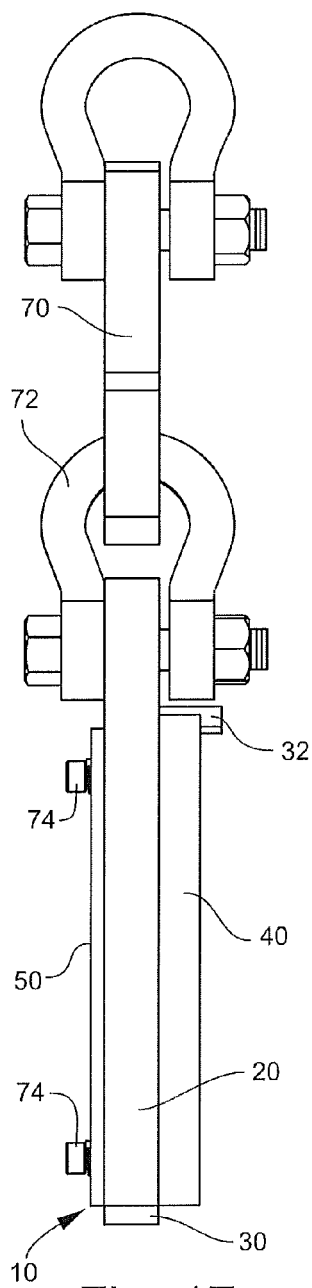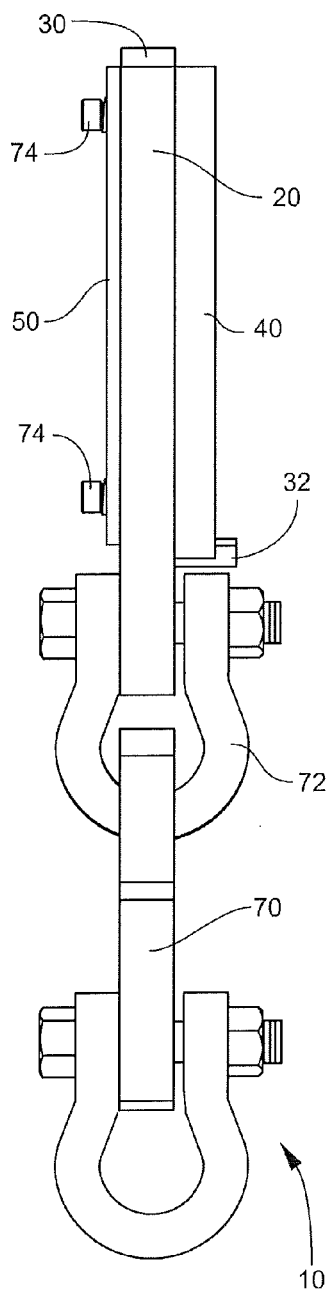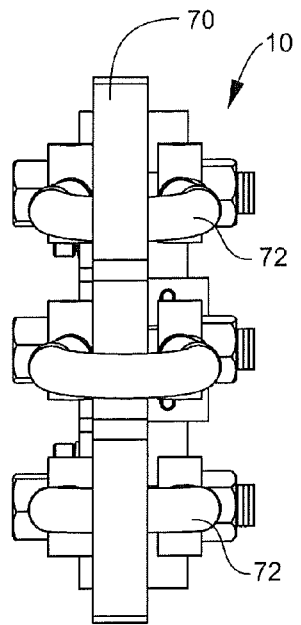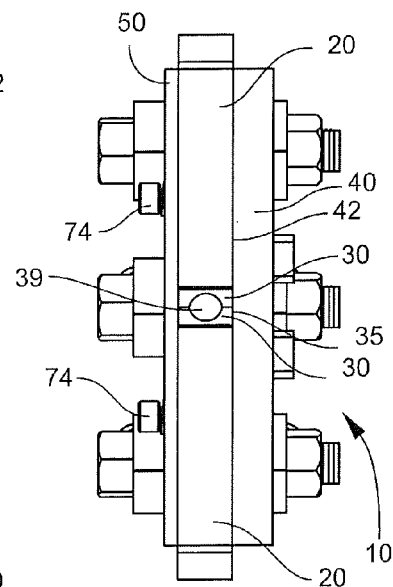
Fig. 17　　Fig. 18　　Fig. 19
Fig. 20

CLAMP FOR A TENSILE IMPLEMENT AND METHOD OF CLAMPING A TENSILE IMPLEMENT

CROSS-REFERENCE TO RELATED APPLICATION

This application is a continuation-in-part application of and expressly incorporates by reference co-pending United States application having Ser. No. 13/841,090 filed on Mar. 15, 2013, which has been issued as U.S. Pat. No. 8,857,916 on Oct. 14, 2014.

TECHNICAL FIELD AND BACKGROUND OF THE INVENTION

The present invention relates to the field of clamping devices and particularly to the field of clamping devices used to clamp and secure tensile implements. The invention is a device designed to facilitate the gripping and clamping of a tensile implement without damage to the tensile implement so that the tensile implement may be placed in tension.

Humans have long utilized tensile implements for pulling, fastening, attaching, lifting, and carrying other objects. Early tensile implements may have been simple plant fibers such as vines or vines twisted together. Eventually, humans developed various types of tensile implements such as ropes, wires, cords, cables, chains, and wire ropes. Such tensile implements have been made from any number of naturally occurring fibers, polymers, metals, metal alloys, and other composites materials.

Modern tensile implements are frequently utilized to drive cranes, elevators, rope ways, and mining equipment. They may be utilized in tension for support of bridges, towers, and other elongate structures. In short, tensile implements have broad utility in the industrial world.

Despite their broad utility for carrying large tension via a small diameter elongate implement, tensile implements do have a few limitations. For instance, tensile implements are often made of multi-ply material such as braided rope or braided wire rope or cable. When the multi-ply material is cut or otherwise comes to an end point, there is often a tendency for the rope to fray or to otherwise become unbraided. Thus, there is a need in the art for a device that reduces the incidence of multi-ply tensile implement fray.

Where tensile implements are utilized in fixed, permanent positions, the ropes may be permanently secured via potted ends, poured sockets, eye splices, Flemish eyes, ferrules and the like. However, some of these forms of fixing an end may damage a cable and, in any event, they "fix" the point at which tension may be applied to an end point of the cable. Such a fixation may be problematic in situations where it is desirable to apply tension at different intermediate points along a tensile implement, such as at a midpoint of a wire rope. Thus, there is a need in the art for a clamping device that is not limited to the end of a tensile implement but may positioned, as desired along the length of the tensile implement.

Further, as many tensile implements are made of metal, bending, and repeatedly bending upon frequent use, may damage the metal through metal fatigue. Similarly, some prior art clamping devices may permanently damage a tensile implement when a clamp is applied. The clamp may bend, puncture, or dent the tensile implement thereby reducing its effectiveness when placed in tension. Such action may also prevent the clamped portion from being placed in tension in the future. Therefore, there is a need in the art for a clamping device that does not permanently damage the tensile implement when applied.

A further issue in the art relates to portability and adaptability of the clamping devices. Whereas some tensile implements may be utilized in a fixed location for a singular purpose, it is often the case that tensile implements are used and transported for use in repeated and different applications. As such, clamping devices may be needed in different locations for a particular tensile implement. For instance, a tensile implement may be used as part of a crane to lift material on one day and then used the next day to extract mining equipment from a mine. Or, it may be used to extract mining equipment from a mine on one day and from a different mine on another day. What is more, different applications often require different sizes and types of tensile implements. For instance, a tensile implement of one diameter may be used to extract mining equipment at a job site. At the same job site, a different tensile implement of a second diameter may be utilized in lifting ore which was mined. There exists a need in the art for a clamping device that may be utilized in both applications without the need for a second clamping device.

SUMMARY OF THE INVENTION

It is therefore an object of the present invention to provide a clamp for a tensile implement and method of clamping a tensile implement that is portable and adaptable such that it may be utilized in clamping a variety of different sizes and types of tensile implements and may be easily transported. The clamp of the present invention may be utilized in the clamping of wire ropes that are utilized to drive cranes, elevators, rope ways, cable rigging equipment, dredging equipment, gas and oil pipeline equipment, and mining equipment. The clamp of the present invention may be utilized to secure tensile implements in tension for support of bridges, towers, and other elongate structures. The clamp may be equally utilized in the manufacturing of new wire rope and in wire rope distribution supply warehouses.

It is a further object of the present invention to provide a tensile implement that does not permanently damage the tensile implement when applied.

It is a further object of the present invention to provide a tensile implement that may be positioned, as desired, at any point along the length of the tensile implement without requiring a nearby terminus of the tensile implement. This feature is appreciated when compared to prior art devices such as sockets, eyes, splices etc. . . . which require a terminus and wherein the tensile implement breaks the prior art devices.

It is a further object of the present invention to provide a tensile implement that reduces the incidence of multi-ply tensile implement fray.

These and other objects and advantages of the invention are achieved by providing a clamp for a tensile implement and method of clamping a tensile implement which includes a clamp block for gripping a tensile implement—particularly a tensile implement that is substantially cylindrical such as a wire rope or a cable. The clamp block includes a plurality of paired wedges which grip the tensile implement. The paired wedges have cylindrical voids which are sized to fit particular diameters of tensile implements. Different pairs have different size cylindrical voids. The wedges slide inside a cavity created by a pair of blocks which are attached to a grip base. As the tensile implement is placed in tension, the wedges grip tighter.

According to one embodiment, the plurality of pairs of wedges may be defined by three pairs of wedges with one pair being a small pair, one pair being a medium pair, and one pair being a large pair. The small pair of wedges will accommodate wire rope sizes of ⅛ inch to ½ inch in diameter. The intermediate pair of wedges will accommodate wire rope of sizes ½ inch to 1.0 inches in diameter. The large pair of wedges will accommodate wire rope sizes of 1.0 inches to 1½ inches.

According to one embodiment of the invention, the clamp block may include a symmetrically trapezoidal cavity defined by a set of side surfaces of a pair of blocks which are attached to a top surface of a grip base. Such an embodiment may include a pair of wedges each of a right angle reciprocal triangular shape, fitting within the symmetrically trapezoidal cavity. The wedges may have a bottom surface that is substantially planar and is in a sliding contact with the top surface of the grip base. The wedges may have an outer surface which is the hypotenuse of the right angle reciprocal triangular shape. This outer surface may be in sliding contact with the respective side surface of the blocks. The wedges may also have an inner surface which has a planar edge that is perpendicular to the grip base and a semi-cylindrical void wherein the planar edge and semi-cylindrical void of each wedge, when in contact, together form a cylindrical void. In such an embodiment, the diameter of the cylindrical void is approximately equal the diameter of the tensile implement.

According to another embodiment of the invention the clamp block includes a grip base having a top surface that is substantially planar and a pair of blocks. Each one of the blocks of the pair of blocks has a bottom surface that is substantially planar and is fixed to the grip base. The blocks also have an inner side surface that is perpendicular to the grip base and defined by a plane. The planes of the respective blocks intersect at an acute angle. The clamp block also has a plurality of pairs of wedges. In such an embodiment, each one of the wedges of each of the pairs of wedges of the plurality of wedges has a bottom surface that is substantially planar and is in a sliding contact with the top surface of the grip base. Each wedge also has an outer surface that is perpendicular to the grip base, is in sliding contact with the respective inner side surface of the blocks, and is defined by the plane that defines the inner surface of the blocks such that the wedges slide along the plane and are in sliding contact with the inner surface of the blocks. Each wedge also has an inner surface that includes a planar edge that is perpendicular to the grip base and a semi-cylindrical void wherein the planar edge and semi-cylindrical void of each wedge of any pair of the plurality of pairs of wedges are symmetrical and parallel such that when the planar edges of each wedge of any pair of wedges are in contact, each of the semi-cylindrical voids together form a cylindrical void. According to such an embodiment, only one pair of the plurality of pairs of wedges may be sliding contact with the grip base and the pair of blocks at a time. Further, each one of the pairs of the plurality of pairs is interchangeable within the clamp block. According to such an embodiment, the diameter of the cylindrical void is different for each pair of wedges and the diameter of the cylindrical void is approximately equal to diameter of the tensile implement.

According to another embodiment of the invention, the tensile implement is selected from the group consisting of wires, cords, cables, ropes, chains, and wire ropes, wherein the tensile implement extends through the cylindrical void. The tensile implement may extend through the clamp on each end of the clamp without requiring an adjacent terminus or bend such that the clamp may be positioned midway on a run wire rope if necessary for a given application.

According to another embodiment of the invention, the diameter of the cylindrical void for any pair of the plurality of pairs of wedges is no smaller than ⅛ inch and no larger than 1½ inches.

According to another embodiment of the invention, the clamp block further includes a top plate attached to a top surface of the pair of blocks forming a cover for the pairs of wedges.

According to another embodiment of the invention, the clamp bock further includes an spreader block for attaching the clamp block to a fixed position.

According to another embodiment of the invention, the spreader block comprises one or more shackles.

According to another embodiment of the invention, the clamp block further includes an impact surface attached to each one of the wedges of the plurality of pairs of wedges, the impact surface being perpendicular to a length of the semi-cylindrical void and designed to withstand blows from a hammer or mallet.

According to another embodiment of the invention, the attachment of the pair of blocks to the grip base and of the top plate to the pair of blocks comprises a plurality of threaded bolts.

According to another embodiment of the invention, the plurality of pairs of wedges, the grip base, the pair of blocks, the top plate, and the plurality of threaded bolts are made of metal.

According to another embodiment of the invention, the total weight of the clamp block weighs no more than 500 pounds.

According to another embodiment of the invention, a top plate attached to a top surface of the pair of blocks forms a cover for the pairs of wedges and the symmetrically trapezoidal cavity.

According to another embodiment of a method of the invention, a method of clamping a tensile implement using a clamp block includes a step of providing the tensile implement to be clamped. Another step includes providing the clamp block which includes an attachment point, a grip base having a planar top surface, a pair of grip blocks attached to the attachment point and to the grip base, each one of the blocks of the pair of blocks having a bottom surface that is substantially planar fixed to the grip base and also having an inner side surface that is perpendicular to the grip base and defined by a plane, the planes of the respective blocks intersecting at an acute angle. The clamp block provided in this step also includes a top plate attached to the pair of blocks, and a cavity between the inner surfaces of the pair of blocks. Another step includes providing a plurality of pairs of wedges. Each one of the wedges of each of the pairs of wedges of the plurality of wedges includes a bottom surface that is planar and is in a sliding contact with the top surface of the grip base. The wedges also include an outer surface that is perpendicular to the grip base, is in sliding contact with the respective inner side surface of the blocks, and is defined by the plane that defines the inner surface of the blocks such that the wedges slide along the plane and are in sliding contact with the inner surface of the blocks. The wedges further include an inner surface having a planar edge that is perpendicular to the grip base and a semi-cylindrical void wherein the planar edge and semi-cylindrical cavities of each wedge of any pair of the plurality of pairs of wedges are symmetrical and parallel such that when the planar edges of each wedge of any pair of wedges are in contact, each of the semi-cylindrical voids together form a cylindrical void.

A next step includes providing a hammer or mallet capable of imparting blows onto the wedges. Another step may include measuring the diameter of the tensile implement. Another step includes selecting the pair of wedges from the plurality of pairs of wedges that has a cylindrical void diameter closest to the diameter of the tensile implement without being larger than the diameter of the tensile implement. Another step may include inserting the pair of wedges into the cavity between the inner surfaces of the pair of blocks. Another step may include placing the tensile implement into the cylindrical void of the pair of wedges. Another step may include hammering each of the wedges of the pair of selected wedges with the hammer or mallet until the wedges securely envelop the tensile implement within the cylindrical void.

BRIEF DESCRIPTION OF THE DRAWINGS

The present invention is best understood when the following detailed description of the invention is read with reference to the accompanying drawings, in which:

FIG. 5A is a top perspective view of a pair of wedges in the clamped position;

FIG. 5B is a top perspective view of a pair of wedges in the open position;

FIG. 5C is an end view of a pair of wedges in the clamped position;

FIG. 6A is a top perspective view of a pair of wedges in the clamped position having a cylindrical void smaller than the wedges of FIG. 5A;

FIG. 6B is a top perspective view of a pair of wedges in the open position having a cylindrical void smaller than the wedges of FIG. 5B;

FIG. 6C is an end view of a pair of wedges in the clamped position having a cylindrical void smaller than the wedges of FIG. 5C;

FIG. 7A is a top perspective view of a pair of wedges in the clamped position having a cylindrical void smaller than the wedges of FIG. 6A;

FIG. 7B is a top perspective view of a pair of wedges in the open position having a cylindrical void smaller than the wedges of FIG. 6B;

FIG. 7C is an end view of a pair of wedges in the clamped position having a cylindrical void smaller than the wedges of FIG. 6C;

FIG. 17 is a side view;

FIG. 18 is a side view;

FIG. 19 is a side view;

FIG. 20 is a side view;

DESCRIPTION OF THE PREFERRED EMBODIMENT AND BEST MODE

Figure 1:
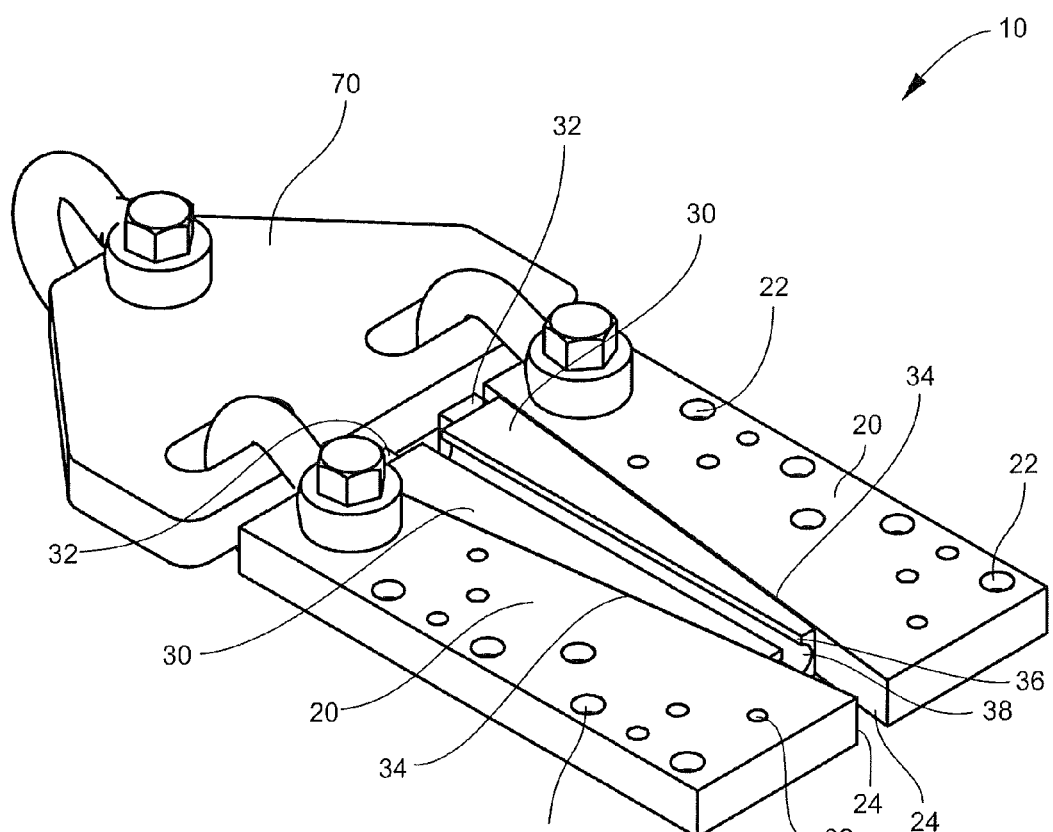
FIG. 1 is a top partial perspective view showing the wedges in the open position.

Referring now specifically to the drawings, FIG. 1 shows a partial view of the clamp 10 for a tensile implement. A pair of blocks 20 are shown. The pair of blocks 20 may be made of metal. The pair of bocks 20 has a plurality of attachment points 22. The attachment points 22 may be threaded holes designed to accept threaded bolts. Each of the blocks 20 of the pair of blocks 20 has an inner side surface 24. The inner side surface 24 is substantially planar. The inner side surfaces 24 of the blocks 20 define two sides of a generally symmetrically trapezoidal cavity. A pair of wedges 30 is also shown. The pair of wedges 20 are right angle reciprocal triangular in shape and together fit within the generally symmetrically trapezoidal cavity defined by the inner side surfaces 24 of the blocks 20. The wedges 30 may be made of metal. Each of the wedges 30 has an outer surface 34 that slides in contact with the inner surface 24 of the blocks 20. This outer surface 34 is the hypotenuse of the triangular shape of the wedges 30. Each of the wedges 30 also has an inner surface 36 and a semi-cylindrical void 38. The inner surface 36 is substantially planar. A spreader block 70 is also shown for attaching the device to another device, vehicle, or location. The spreader block 70 may be triangular in shape and be positioned to enable pulling of the device along the horizontal axis parallel of the tensile implement.

Figure 2:
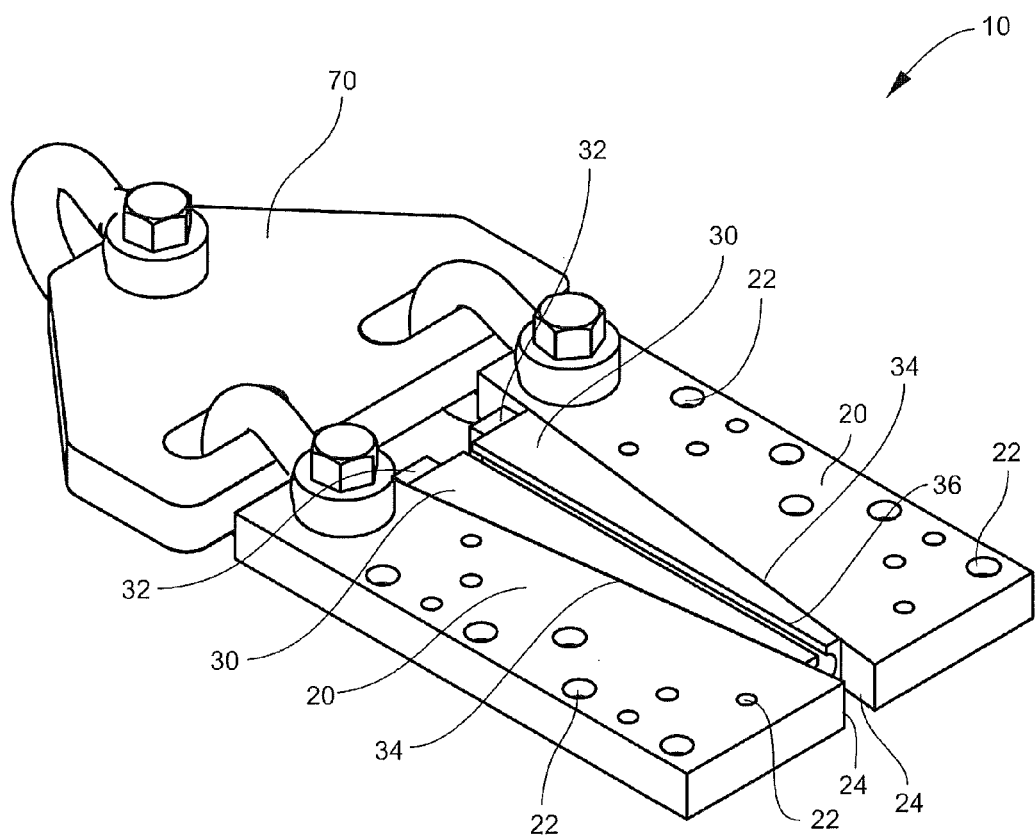
FIG. 2 is a top partial perspective view showing the wedges in the partially open position.

As shown in FIG. 2, the wedges 30 slide via their outer surface 34 along the inner surface 24 of the blocks 20. The wedges 30 in FIG. 2 are closer together than in FIG. 1, the wedges 30 having slid down the length of the inner side 24 of the blocks 20. The line of slide between the outer surface 34 of the wedges 30 and the inner surface 24 of the blocks 20 thus define two planes which intersect at an acute angle at the end of the clamp 10 opposite the spreader block 70.

Figure 3:
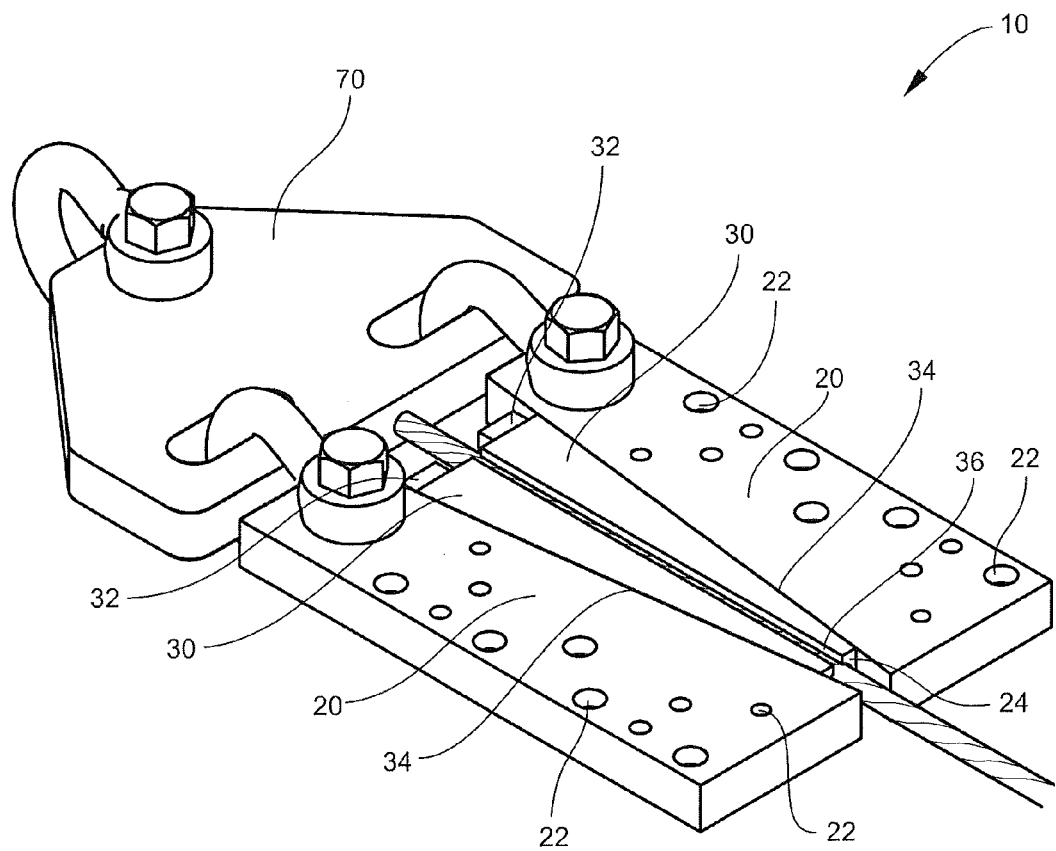
FIG. 3 is a top partial perspective view showing the tensile implement passing through the wedges in the partially open position.
Figure 4:
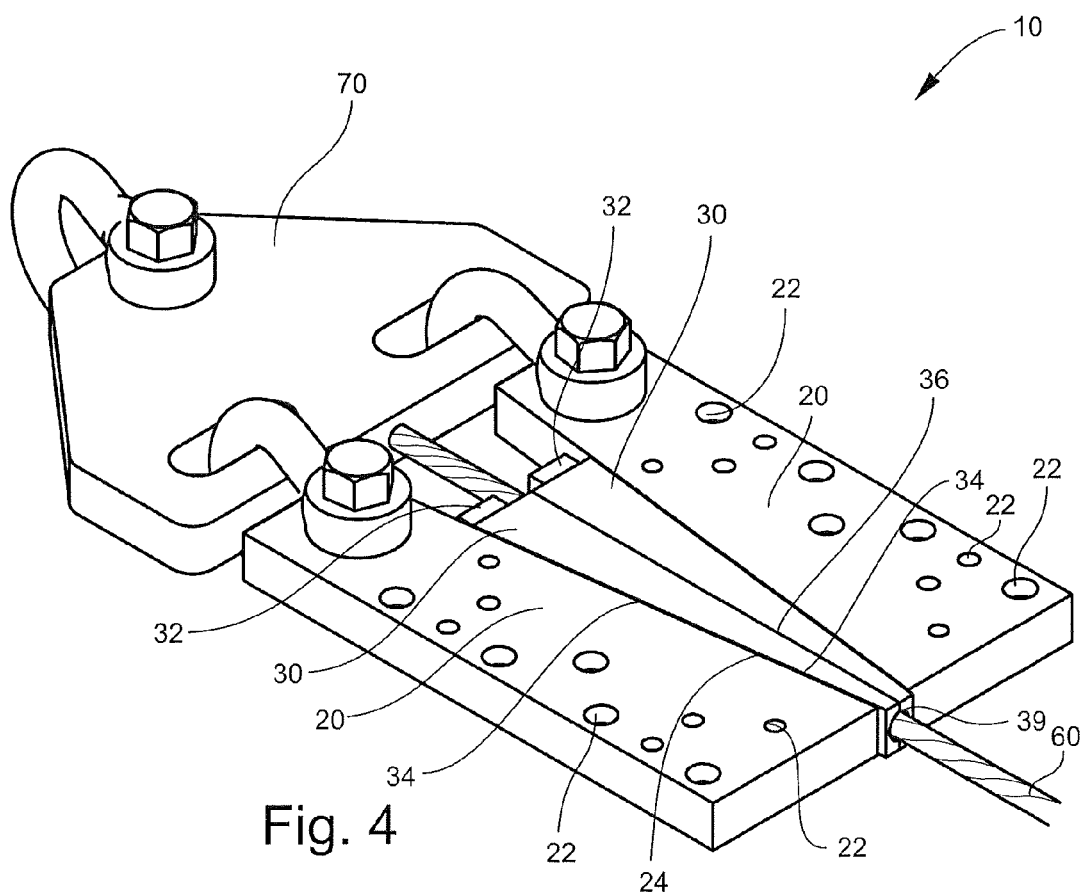
FIG. 4 is a top partial perspective view showing the tensile implement passing through the wedges in the clamped position.

As shown in FIG. 3, as the wedges 30 slide, they surround and envelope a tensile implement 60 such as wire rope or cable which has been placed between the wedges 30. The wedges 30 may slide via blows imparted by a hammer or mallet (not shown) on the respective impact surfaces 32. Alternatively, the wedges 30 may slide via force applied by a hydraulic cylinder (not shown). The tensile implement 60 is surrounded via the semi-cylindrical voids 38 of the inner surface 36 of the wedges 30. As shown in FIG. 4, the wedges 30 have slid even closer together, and away from the spreader block 70, so as to fully envelope a portion of the tensile implement 60. When the tensile implement 60 is fully enveloped by the wedges, the semi-cylindrical voids 38 have come together to form a substantially cylindrical void 39. The diameter of the substantially cylindrical void 39 of the wedges 30 is approximately equal to the diameter of the tensile implement 60.

As shown in FIGS. 5A, 5B, 5C, 6A, 6B, 6C, 7A, 7B, and 7C, the invention includes interchangeable pairs of wedges 30 having different size semi-cylindrical voids 38. Each wedge 30 includes an impact surface 32, an outer surface 34, and inner surface 36, and a semi-cylindrical void 38. When the wedges come together, the semi-cylindrical voids 38 for a cylindrical void 39. Each pair of wedges 30 forms a family of wedges. For instance, FIGS. 5A, 5B, and 5C embody one family. FIGS. 6A, 6B, and 6C embody another family. FIGS. 7A, 7B, and 7C embody another family. As shown, the cylindrical void 39 varies depending on the family. For instance, in FIG. 5A is larger than the cylindrical void 39 in FIG. 6A which is larger than the cylindrical void 39 in FIG. 7A. The cylindrical voids 39 for any pair of wedges 30 is no smaller than ⅛ inch and no larger than 1½ inches.

Figure 8A:
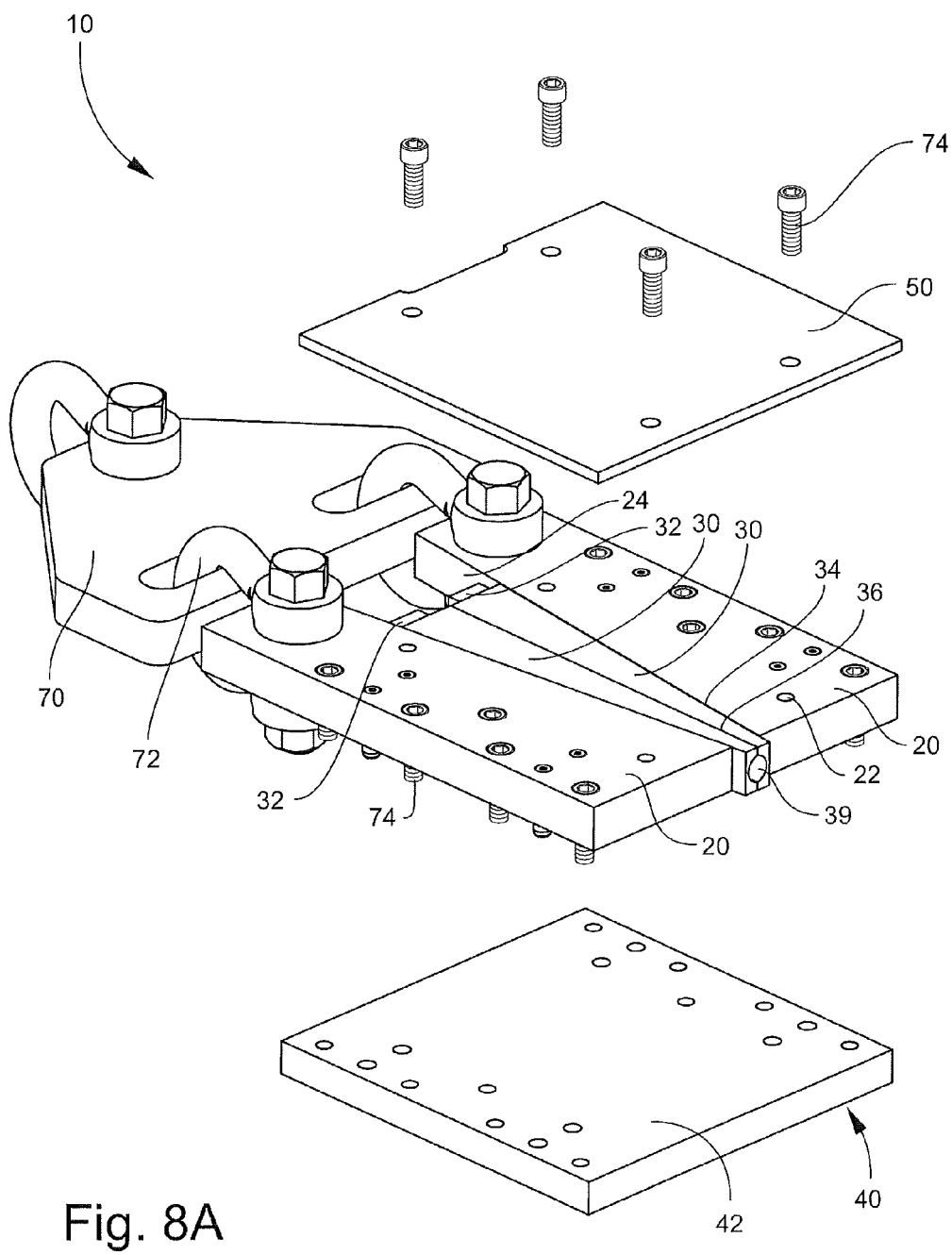
FIG. 8A is a partially exploded top perspective view showing the wedges in the clamped position.
Figure 8B:
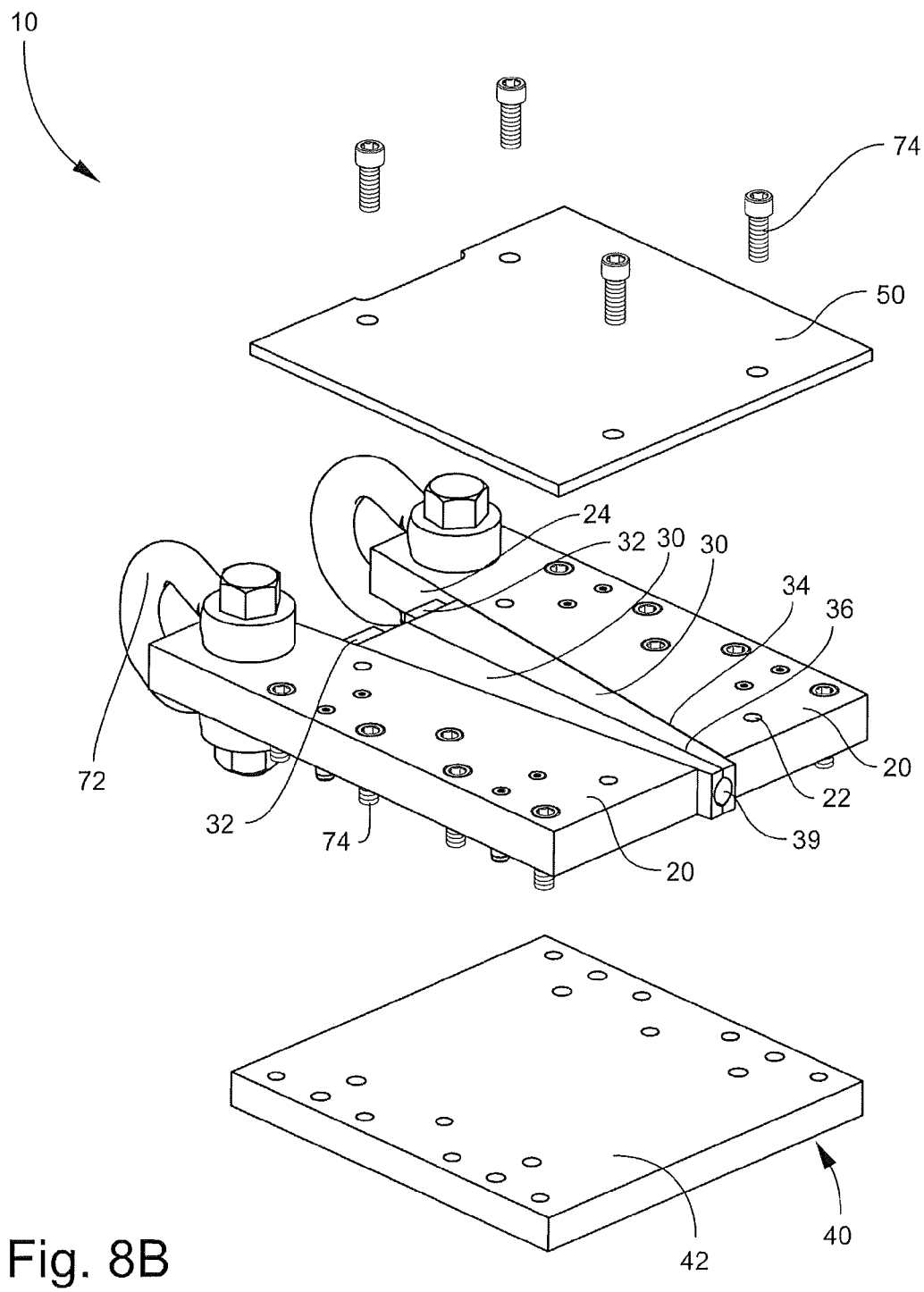
FIG. 8B is a partially exploded top perspective view showing the wedges in the clamped position with shackles but without a spreader block.
Figure 9A:
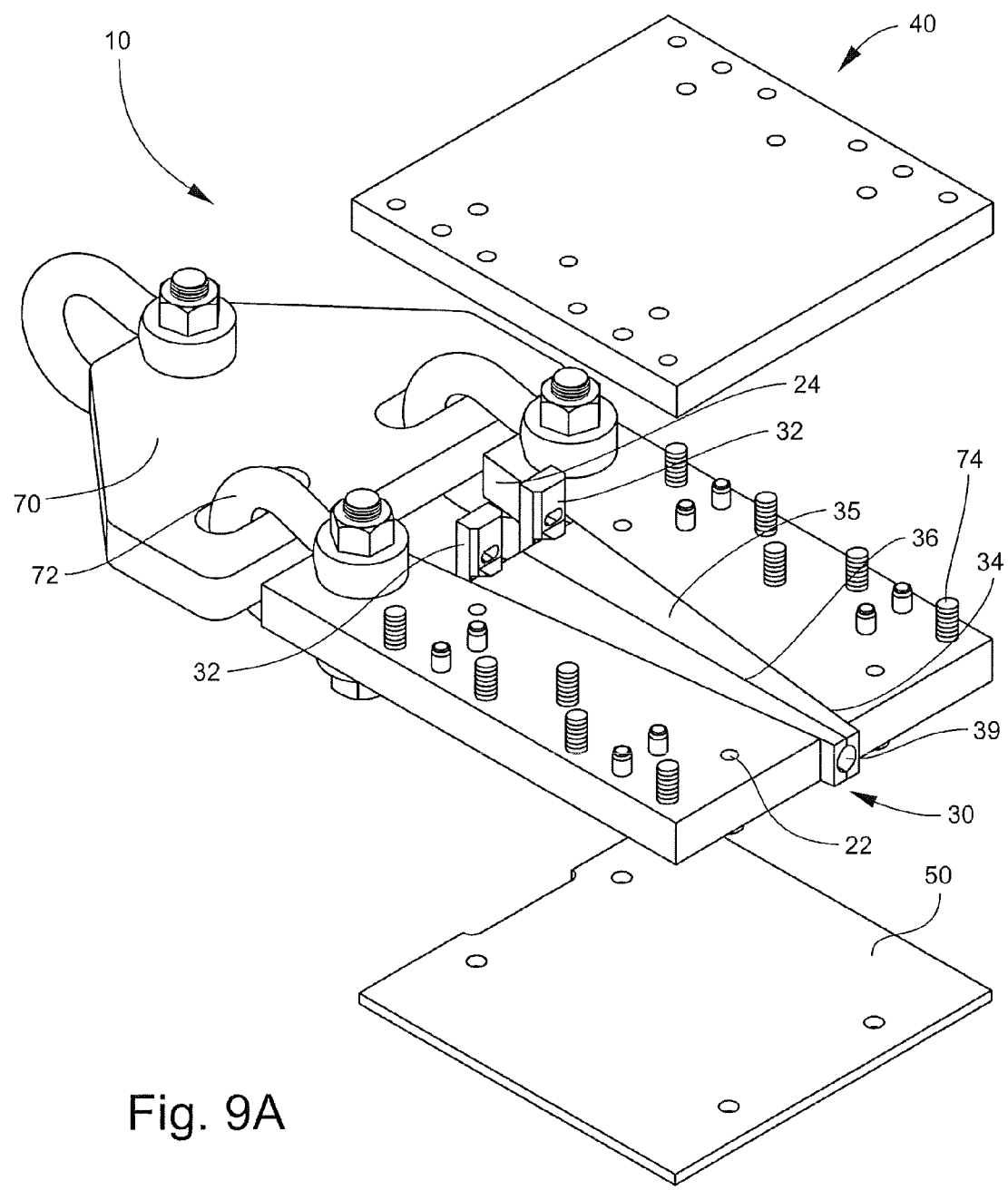
FIG. 9A is a partially exploded bottom perspective view showing the wedges in the clamped position.
Figure 9B:
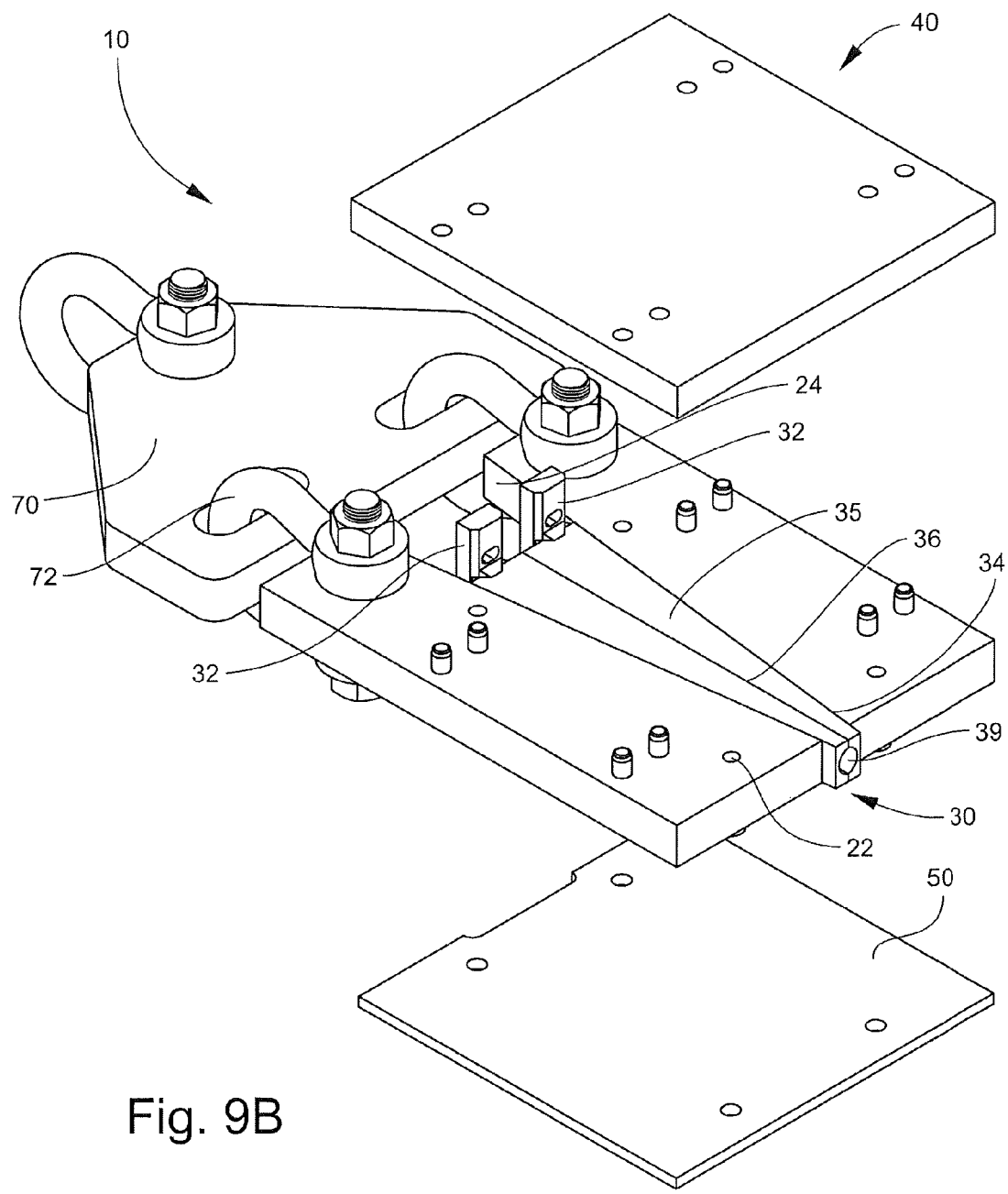
FIG. 9B is a partially exploded bottom perspective view of an embodiment using welding rather than bolts for connection and showing the wedges in the clamped position.
Figure 9C:
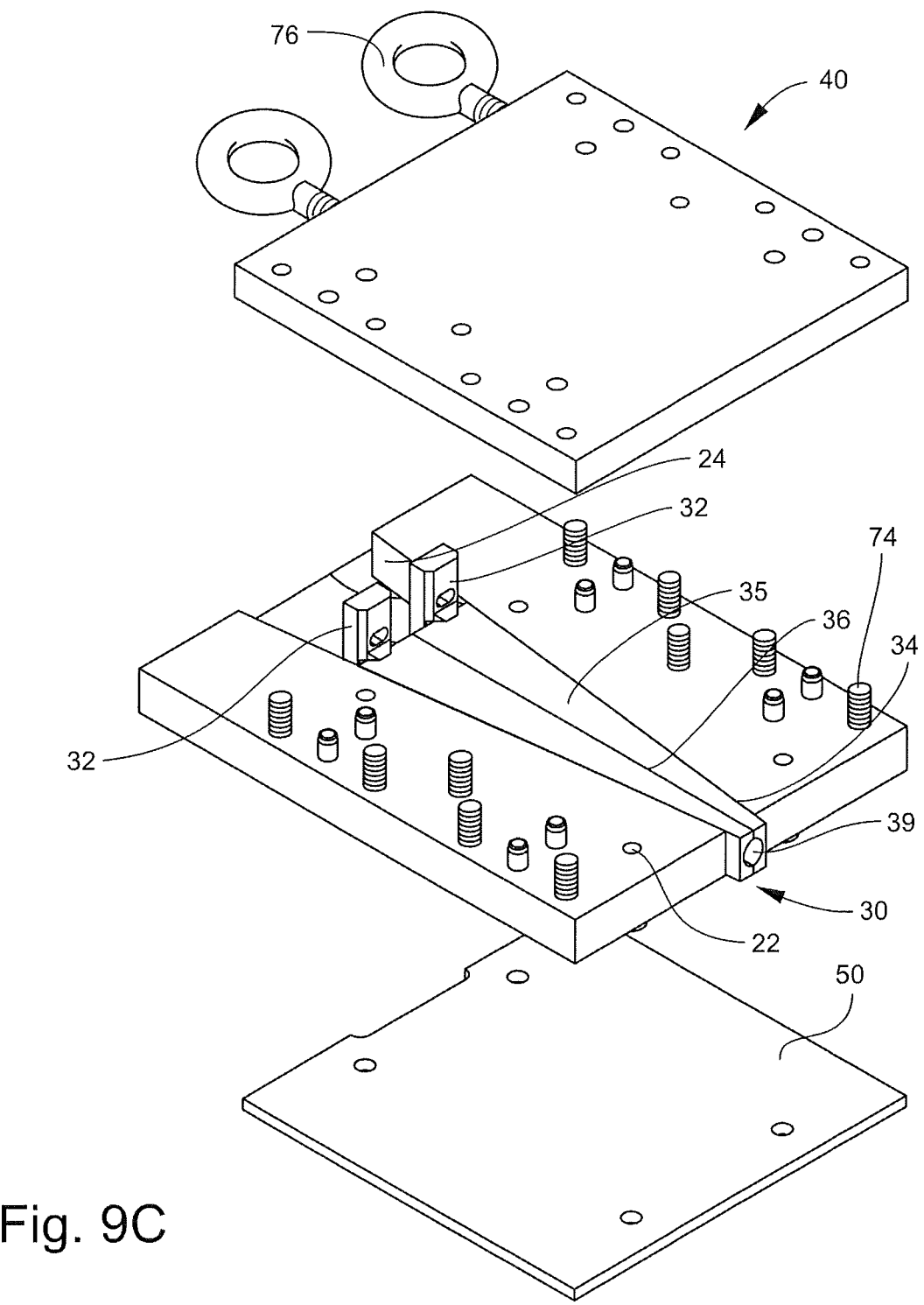
FIG. 9C is a partially exploded bottom perspective view showing the wedges in the clamped position with eye bolts but without shackles or a spreader block.
Figure 10:
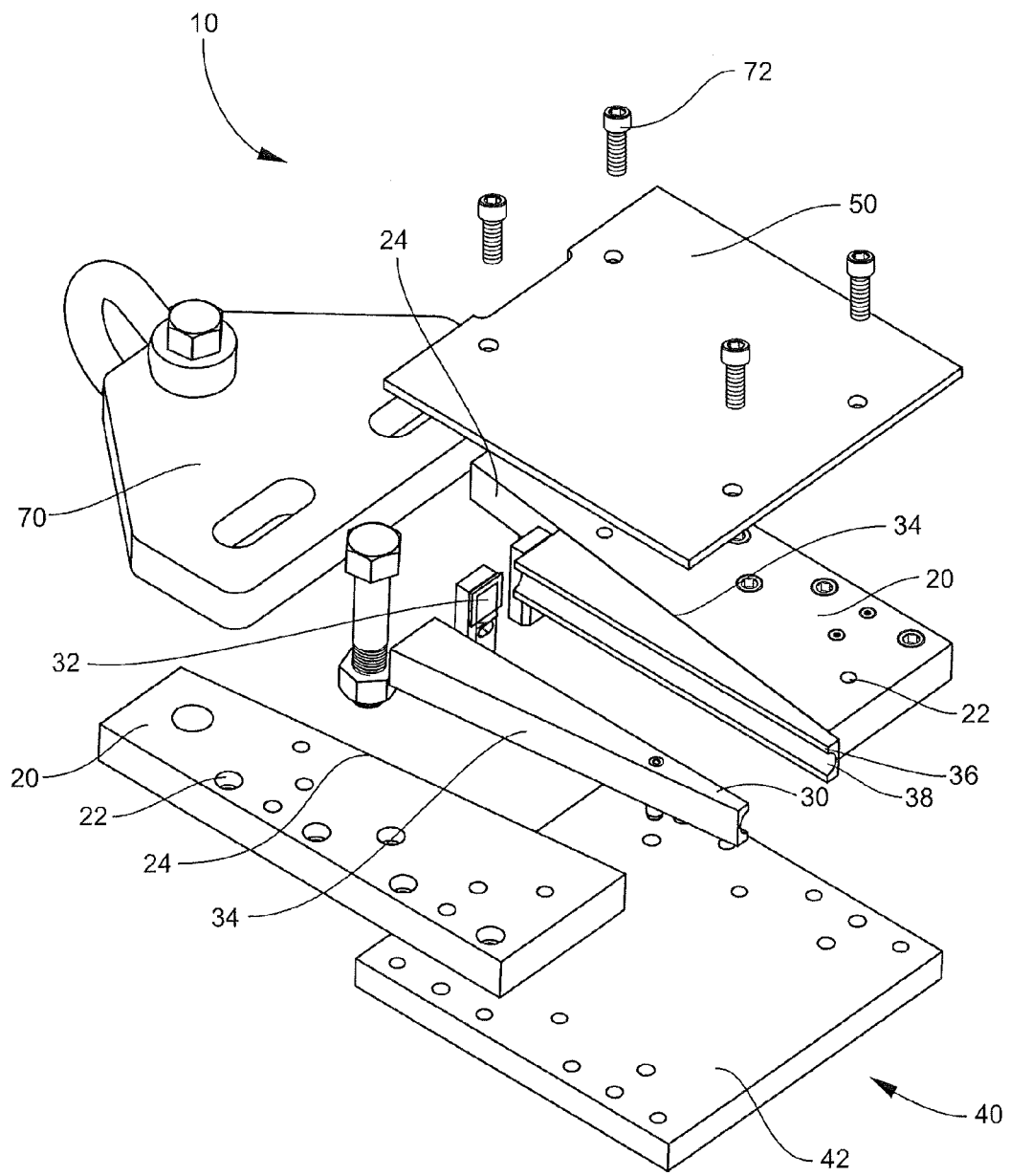
FIG. 10 is a an exploded top perspective view.
Figure 11:
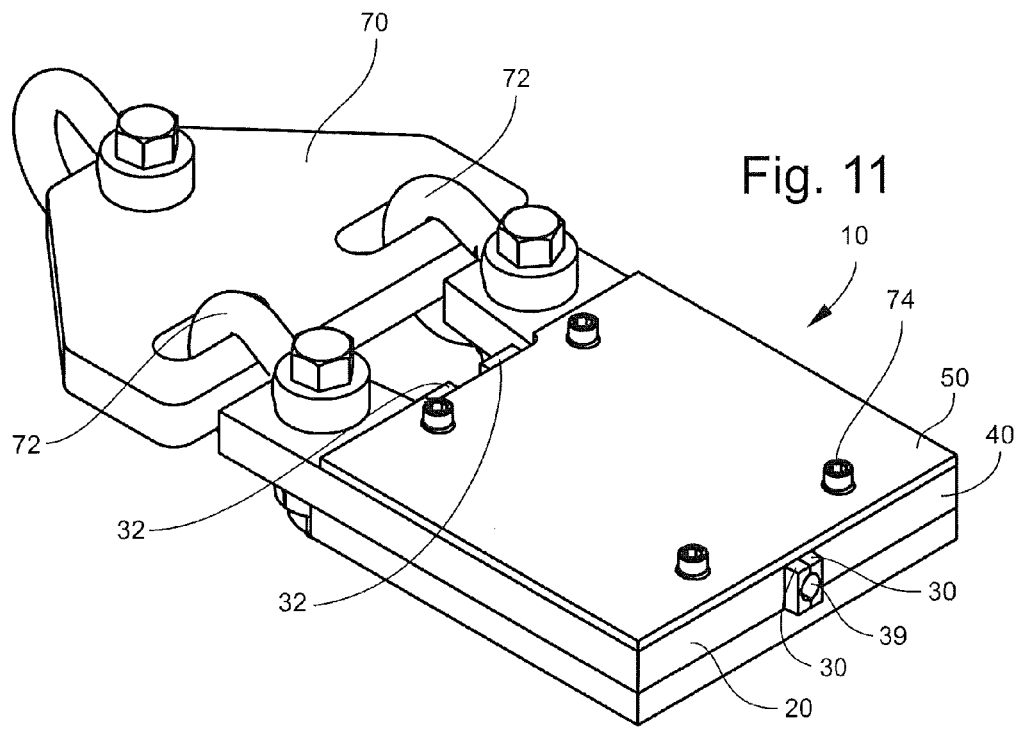
FIG. 11 is a top perspective view.

The smallest family of wedges 30, FIGS. 5A, 5B, and 5C, handles tensile implement 60 sizes ⅛ inch to ½ inch within the cylindrical void 39. In this smallest family, wedges 30 may have an approximate 8 inch by 8 inch outer perimeter when the wedges are in the clamped position. In this smallest family of wedges 30, rather than use of the spreader bar 70, the invention contemplates use of the just the shackles 72 as shown in FIG. 8B or use of eye bolts 76 which are drill and tapped into the base plate 40 as shown in FIG. 9C.

The intermediate family of wedges 30, FIGS. 6A, 6B, and 6C, handles tensile implement 60 sizes ½ inch to 1.0 inch within the cylindrical void 39. In this intermediate family, wedges 30 may have an approximate 12 inch by 12 inch outer perimeter when the wedges 30 are in the clamped position. In intermediate family of wedges 30, rather than use of the spreader bar 70, the invention contemplates use of the just the shackles 72 as shown in FIG. 8B or use of eye bolts 76 which are drill and tapped into the base plate 40 as shown in FIG. 9C.

Figure 23:
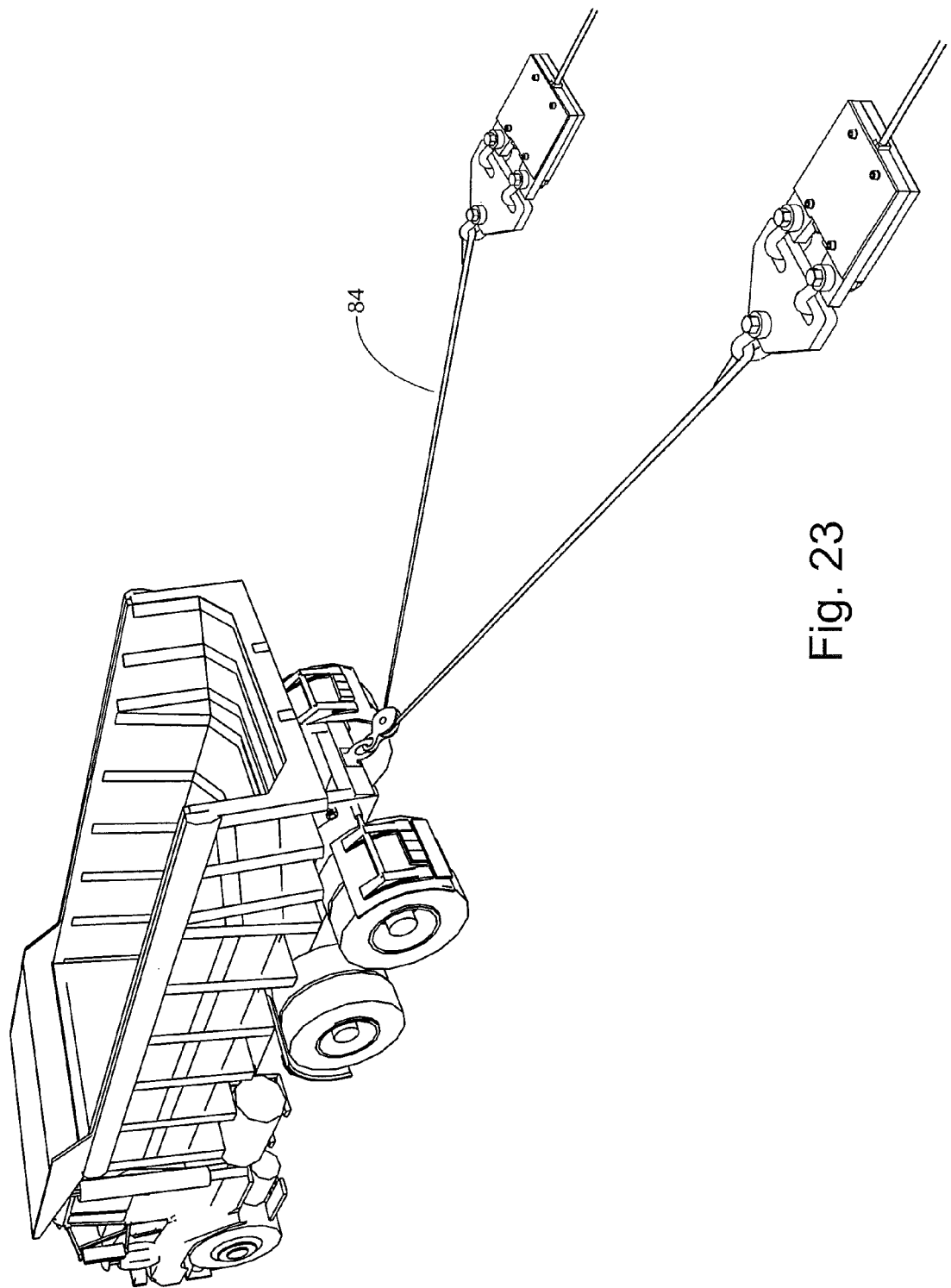
FIG. 23 is a top perspective view of the invention utilizing the spreader block attached to a towing vehicle.
Figure 24:
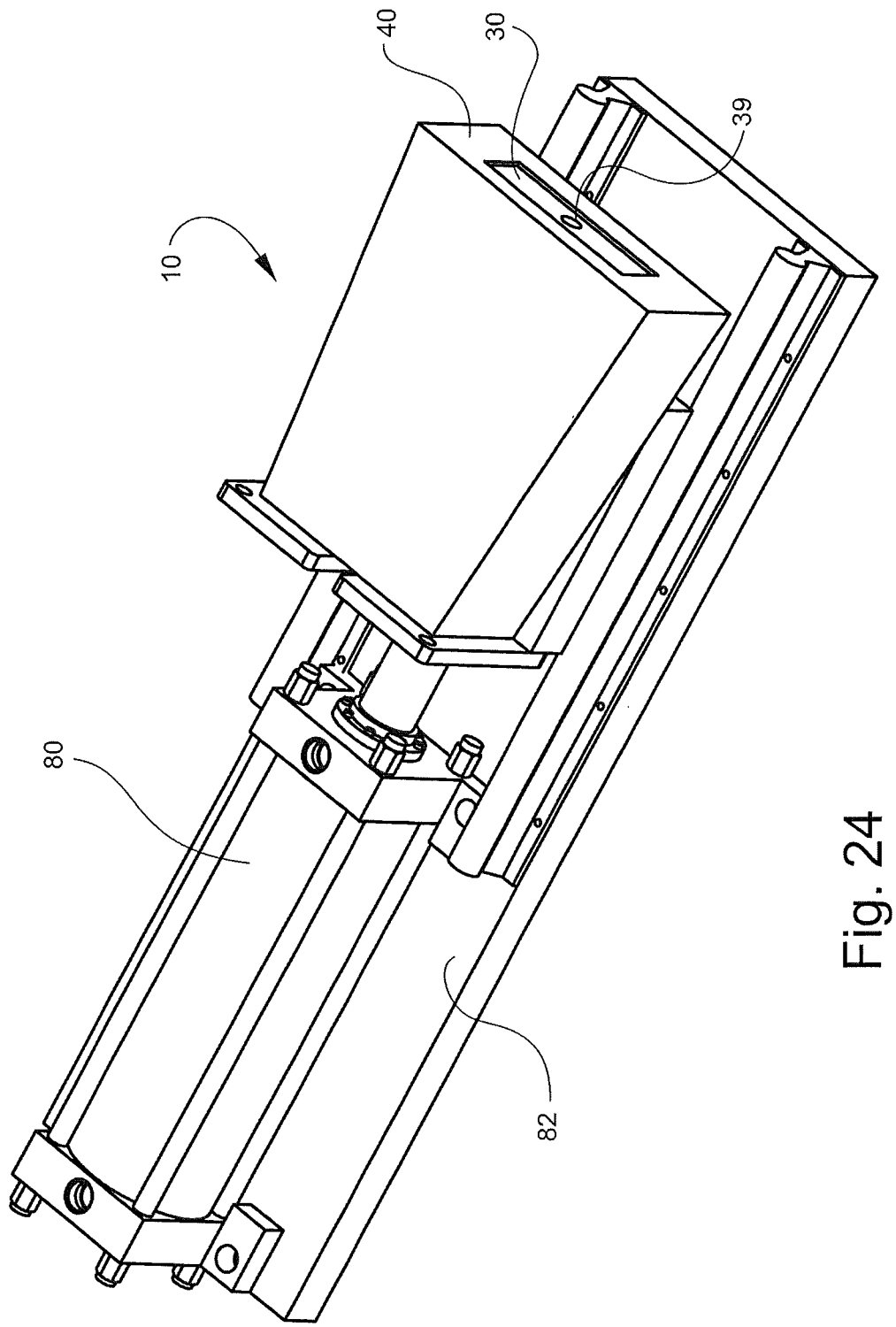
FIG. 24 is a top perspective view of the invention mounted on rails and attached to a hydraulic cylinder for pulling clamped tensile implements.
Figure 25:
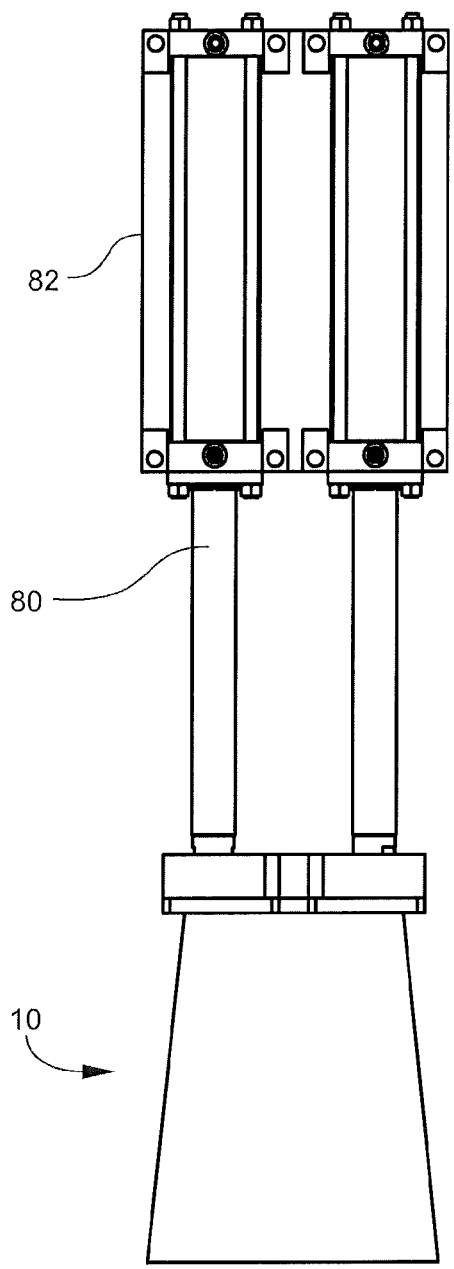
FIG. 25 is a top view of the invention mounted on rails and attached to a hydraulic cylinder for pulling clamped tensile implements.
Figure 26:
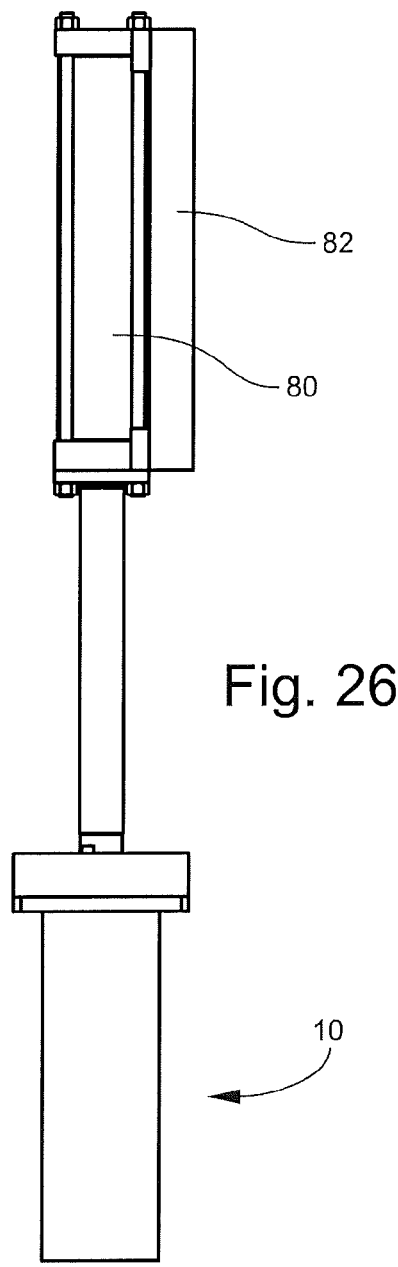
FIG. 26 is a side view of the invention mounted on rails and attached to a hydraulic cylinder for pulling clamped tensile implements.
Figure 27:
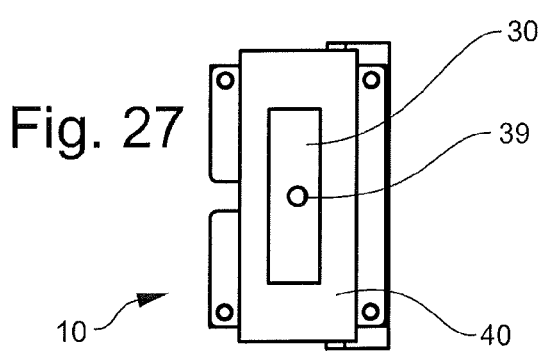
FIG. 27 is an end view of the invention mounted on rails and attached to a hydraulic cylinder for pulling clamped tensile implements.

The largest family of wedges 30, FIGS. 7A, 7B, and 7C, handles tensile implement 60 sizes 1.0 inch to 1½ inch within the cylindrical void 39. In this largest family, the invention will include the spreader block 70 for pulling rather than the just the shackles 72 alone as shown in FIG. 8B or use of eye bolts 76 which are drill and tapped into the base plate 40 as shown in FIG. 9C. FIG. 23 shows a how the spreader block 70 may be attached to the device 10 via shackles 72 and also to a large towing vehicle 84. The towing vehicle 84 may be any large powered vehicle, such as a Caterpillar brand 777 dump truck, sufficiently powered to ground and/or tow the device 10 in the clamped position which is clamped around a tensile implement 60.

As shown in FIGS. 8A, 8B, 9A, 9B, 9C, and 10, the clamp 10 also includes a grip base 40 and a top plate 50. The top plate 50 attaches to the grip blocks 20 via attachment means such as bolts 74 attaching to attachment points 22. The top plate 50 and the bolts 74 may be made of metal. The grip base 40 attaches to the blocks 20 via attachment means such as bolts 74 attaching to attachment points 22. The grip base 40 may be made of metal. As especially shown in FIG. 9B, rather than the bolts 74, the grip base 40 may be attached via a welded connection that does not rely on bolts 74.

The grip base 40 has a substantially planar top surface 42. The inner surface 34 of the blocks 30 are perpendicular to the top surface 42 of the grip base 40. The outer surface 24 of the wedges 34 is perpendicular to the top surface 42 of the grip base 40. The inner surface 36 of the wedges 30 is perpendicular to the top surface 42 of the grip base 40. As the wedges 30 slide along the inner surface 24 of the blocks 20, they also slide on top of the planar top surface 42 of the grip base 40. The wedges 30 slide in this way along a substantially planar bottom surface 35. The bottom surface 35 of the wedges 30 is parallel to the top surface 42 of the grip base 40. The spreader block 70 may be attached via shackles 72.

Figure 12:
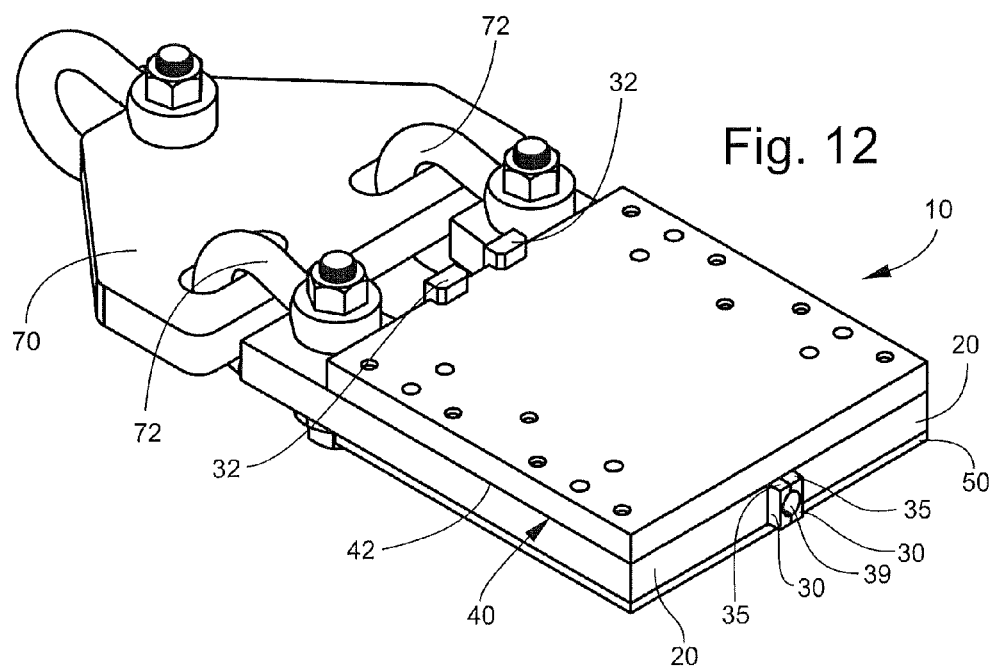
FIG. 12 is a bottom perspective view.
Figure 13:
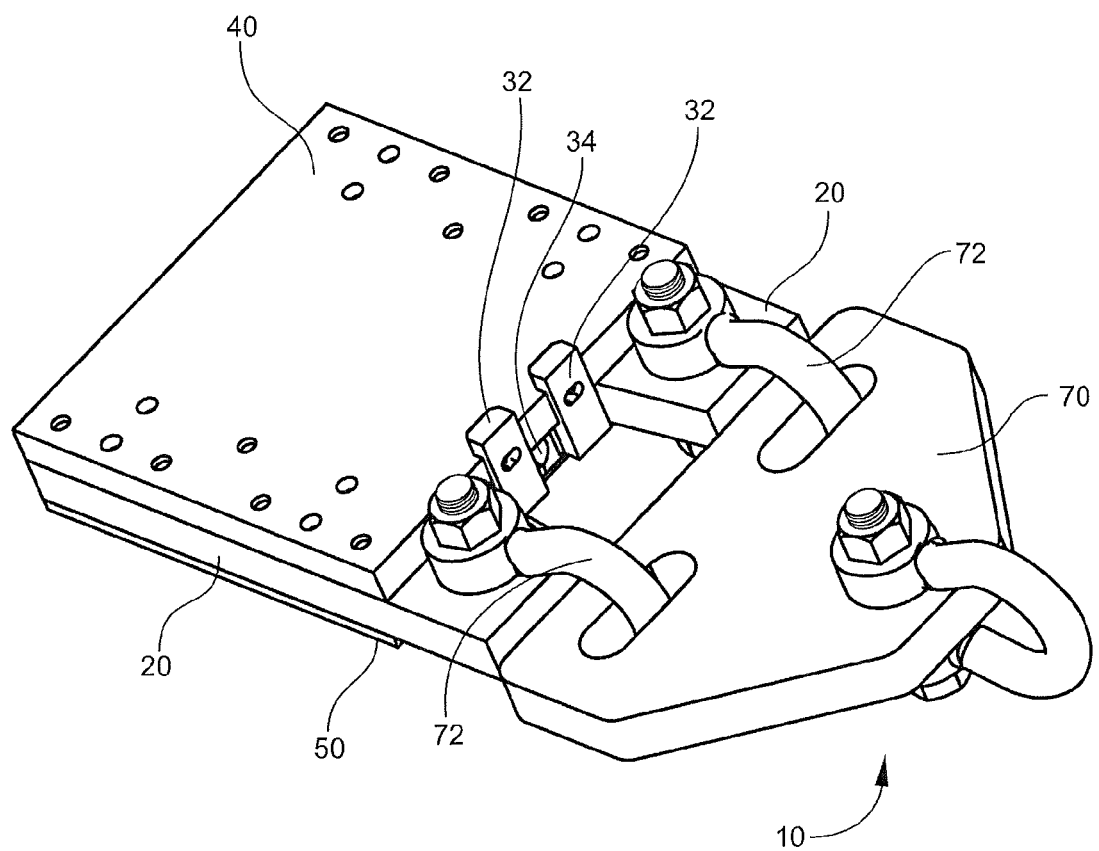
FIG. 13 is a bottom perspective view.
Figure 14:
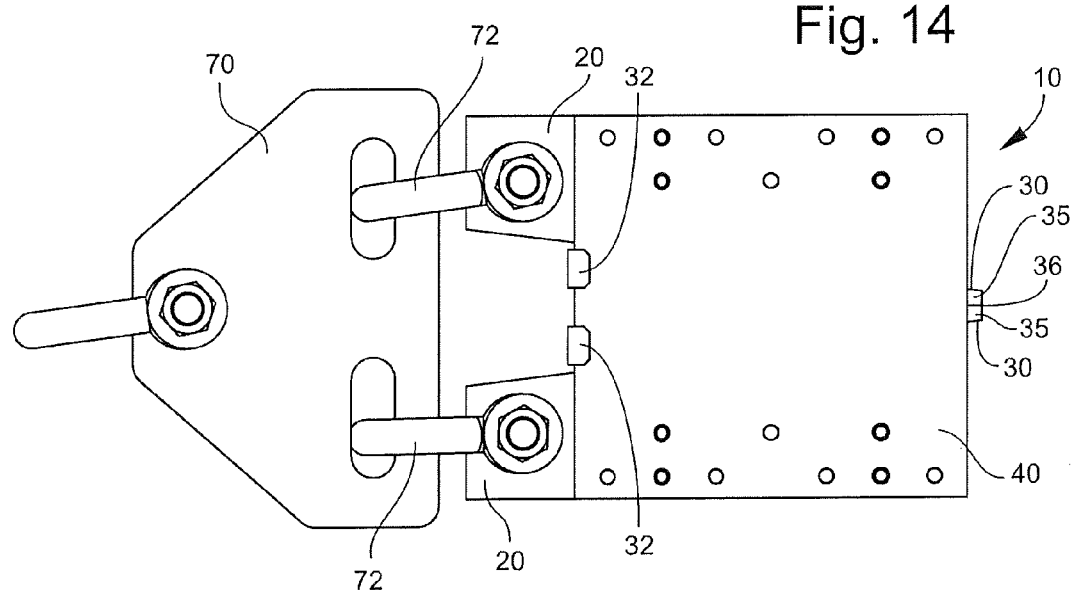
FIG. 14 is a bottom view.
Figure 15:
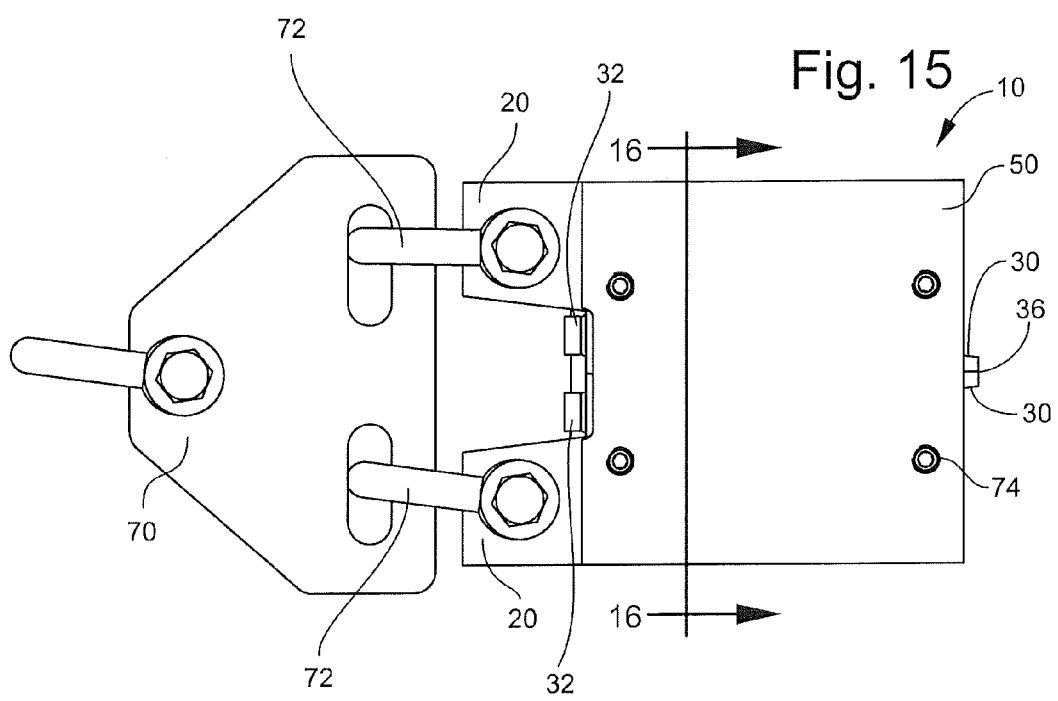
FIG. 15 is a top view.
Figure 16:
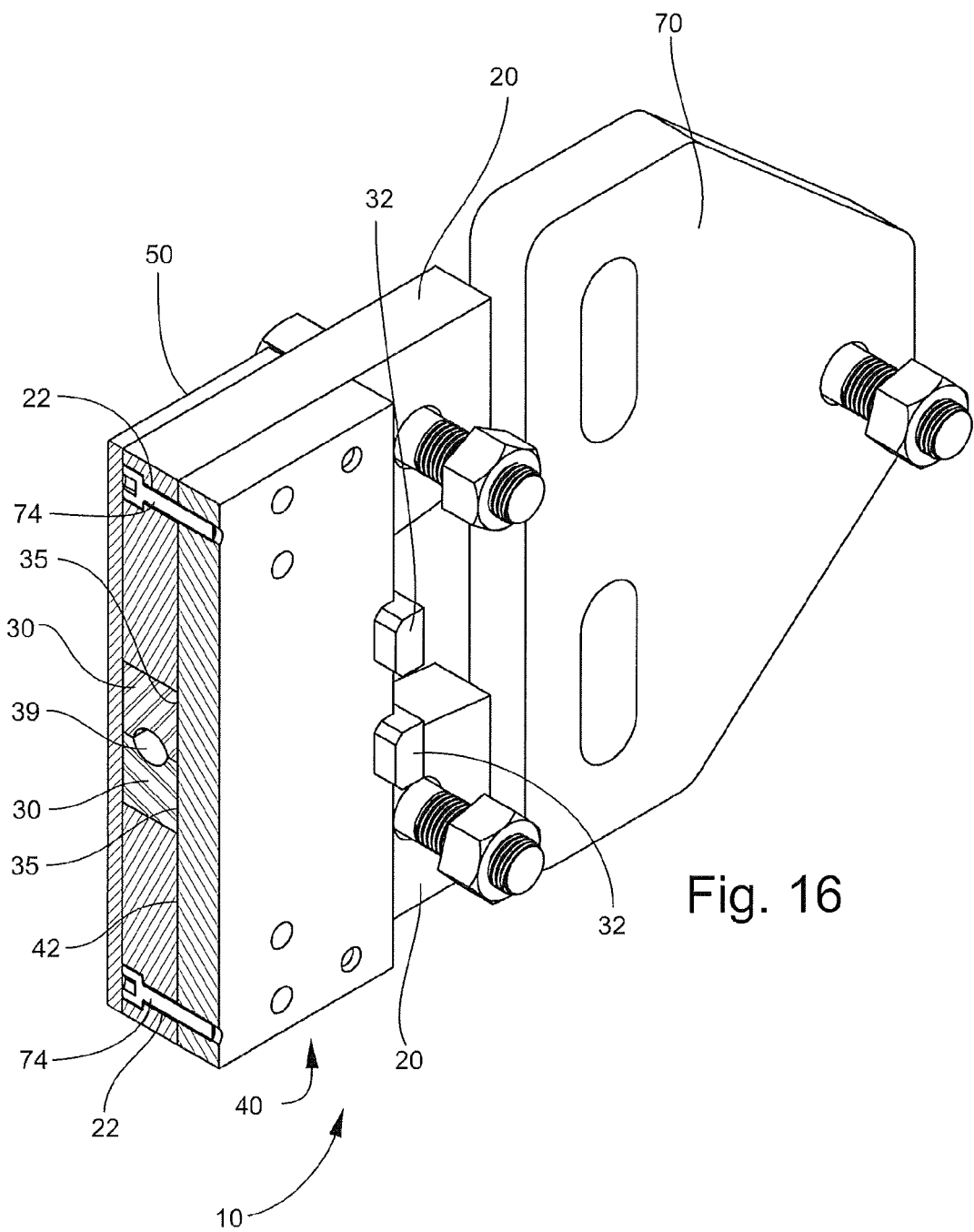
FIG. 16 is a perspective view of a cross section of FIG. 15.

Referring to FIGS. 11, 12, 13, 14, 15, 16, 17, 18, 19, and 20, the fully assembled clamp 10 can be seen. The assembled clamp 10 weighs no more than 500 pounds. The top plate 50 is attached to the blocks 20 via bolts 74. Likewise, the base plate 40 is attached to the blocks 20 via bolts 74. In the clamped position, the wedges 30 extend slightly through the cavity between the blocks 20 to form substantially cylindrical void 39. The impact surfaces 32 of the wedges 30 extend to hook underneath the grip base 40 as best shown in FIGS. 12, 13, and 16.

Figure 21:
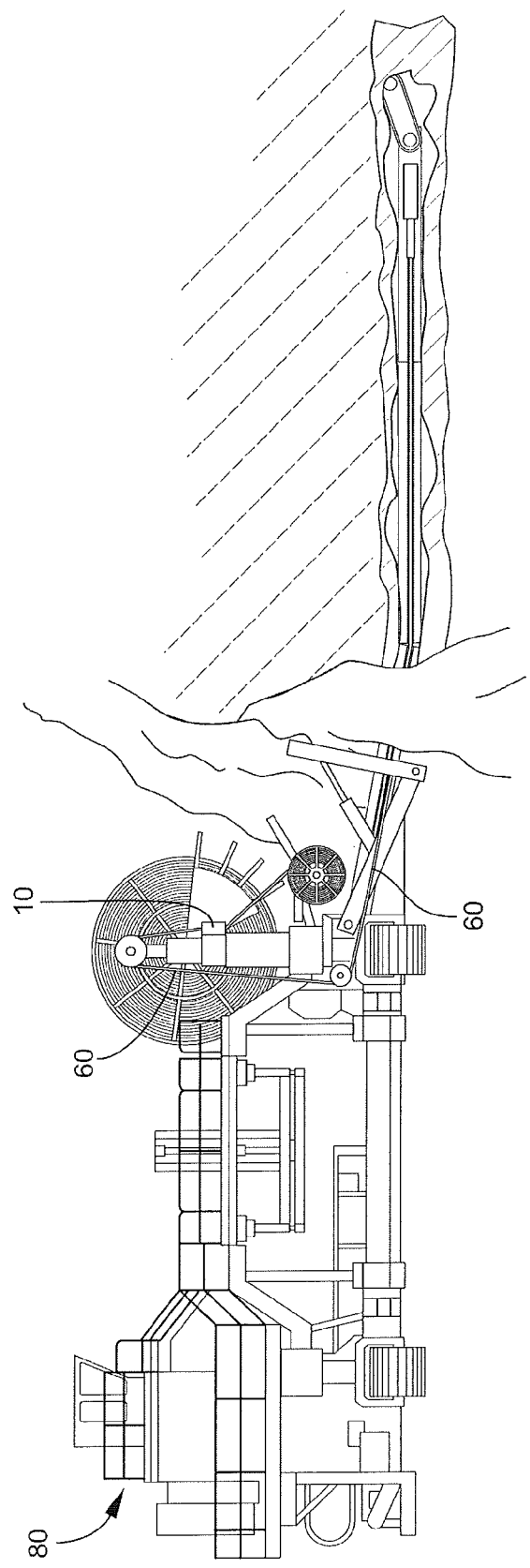
FIG. 21 is a side view of the invention attached to a highwall mining machine.
Figure 22:
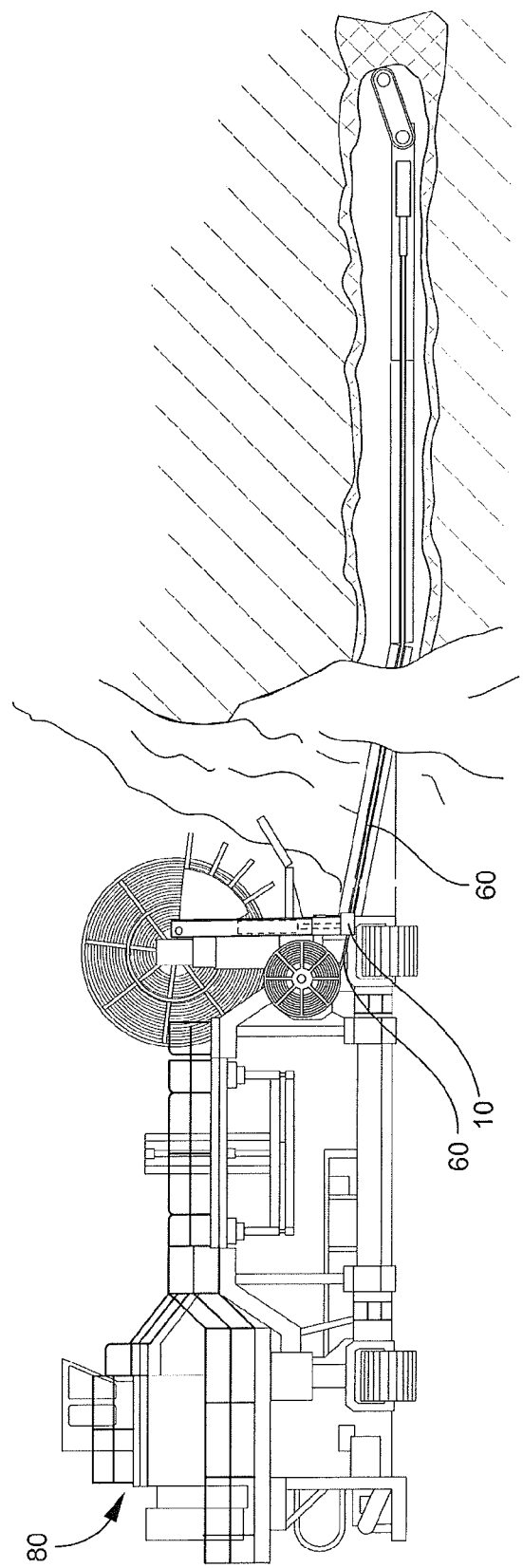
FIG. 22 is a side view of the invention attached to a highwall mining machine.

As discussed above, the clamp 10 contemplates clamping around a tensile implement 60. One reason for clamping may include applying a force to the tensile implement 60 about the claim 10. As an example of situations wherein such force may be applied, FIGS. 21 and 22 show the clamp 10 applied in a highwall mining operation. In such an operation, one or more tensile implements 60 may extend along with mining equipment into a mine. The clamp 10 may be used to secure the tensile implement 10 so that pressure can be applied to the tensile impellent 10 in order to extract the mining equipment from the mine. Because such uses are expressly contemplated, the invention further includes two embodiments of clamping and applying a force. One embodiment includes a manual configuration as shown in FIG. 23. FIG. 23 shows the spreader block 70 attached to the claim 10 and to a large towing vehicle 84. In such an embodiment, the clamp 10 will secure the tensile implement 60 and a force will be applied to the clamp 10 from the towing vehicle 84. This force will be accordingly applied to the tensile implement 60. Another embodiment includes a semi-automatic configuration as shown in FIGS. 24, 25, 26, and 27. This configuration includes the clamp being slidingly attached to a slide rail base 82. A hydraulic cylinder 80 is fixedly attached to the base 82 and also to the clamp 10. When the clamp 10 clamps the tensile implement 60 in the clamped position, the hydraulic cylinder 80 may be actuated to apply a force to pull the clamp 10 and place the tensile implement 60 in tension. The configuration of FIG. 24 may be attached to the mining equipment of FIGS. 21 and 22.

A clamp 10 for a tensile implement and method of clamping a tensile implement according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A clamp block for gripping a tensile implement that is substantially cylindrical comprising:
    a. a grip base having a top surface that is substantially planar;
    b. a pair of blocks, each one of the blocks of the pair of blocks having a bottom surface that is substantially planar fixed to the grip base and also having an inner side surface that is perpendicular to the grip base and defined by a plane, the planes of the respective blocks intersecting at an acute angle;
    c. a plurality of pairs of wedges, each one of the wedges of each of the pairs of wedges of the plurality of wedges having
        i. a bottom surface that is substantially planar and is in a sliding contact with the top surface of the grip base,
        ii. an outer surface that is perpendicular to the grip base, is in sliding contact with the respective inner side surface of the blocks, and is defined by the plane that defines the inner surface of the blocks such that the wedges slide along the plane and are in sliding contact with the inner surface of the blocks,
        iii. an inner surface having a planar edge that is perpendicular to the grip base and a semi-cylindrical void wherein the planar edge and semi-cylindrical void of each wedge of any pair of the plurality of pairs of wedges are symmetrical and parallel such that when the planar edges of each wedge of any pair of wedges are in contact, each of the semi-cylindrical voids together form a cylindrical void,
        iv. wherein only one pair of the plurality of pairs of wedges may be in sliding contact with the grip base and the pair of blocks at a time, and
        v. wherein each one of the pairs of the plurality of pairs is interchangeable within the clamp block; and
    d. wherein the diameter of the cylindrical void is different for each pair of wedges and the diameter of the cylindrical void is approximately equal to the diameter of the tensile implement.

2. The clamp block of claim 1 wherein the tensile implement is selected from the group consisting of wires, cords, cables, ropes, chains, and wire ropes, wherein the tensile implement extends through the cylindrical void.

3. The clamp block of claim 2 wherein the diameter of the cylindrical void for any pair of the plurality of pairs of wedges is no smaller than ⅛ inch and no larger than 1½ inches.

4. The clamp block of claim 2 further comprising a top plate attached to a top surface of the pair of blocks forming a cover for the pairs of wedges.

5. The clamp bock of claim 4 further comprising a spreader block for attaching the clamp block to a fixed position.

6. The clamp block of claim 5 wherein the spreader block further comprises one or more shackles.

7. The clamp block of claim 5 wherein the attachment of the pair of blocks to the grip base and of the top plate to the pair of blocks comprises a plurality of threaded bolts.

8. The clamp block of claim 7 wherein the plurality of pairs of wedges, the grip base, the pair of blocks, the top plate, and the plurality of threaded bolts are made of metal.

9. The clamp block of claim 2 further comprising an impact surface attached to each one of the wedges of the plurality of pairs of wedges, the impact surface being perpendicular to a length of the semi-cylindrical void and designed to withstand blows from a hammer or mallet.

10. A clamp block comprising:
    a. a symmetrically trapezoidal cavity defined by a set of side surfaces of a pair of blocks which are attached to a top surface of a grip base;
    b. a pair of wedges each of a right angle reciprocal triangular shape, fitting within the symmetrically trapezoidal cavity, and having
        i. a bottom surface that is substantially planar and is in a sliding contact with the top surface of the grip base,
        ii. an outer surface, comprising the hypotenuse of the right angle reciprocal triangular shape that is in sliding contact with the respective side surface of the blocks such that the wedges can contact one another, and
        iii. an inner surface having a planar edge that is perpendicular to the grip base and a semi-cylindrical void wherein the planar edge and semi-cylindrical void of each wedge, when in contact, together form a cylindrical void; and
    c. wherein the clamp block is configured to grip a tensile implement that is substantially cylindrical in the cylindrical void, and wherein the diameter of the cylindrical void is approximately equal to the diameter of the tensile implement.

11. The clamp block of claim 10 wherein the tensile implement is selected from the group consisting of wires, cords, cables, ropes, chains, and wire ropes, wherein the tensile implement extends through the cylindrical void.

12. The clamp block of claim 10 wherein the diameter of the cylindrical void is no smaller than ⅛ inch and no larger than 1½ inches.

13. The clamp block of claim 10 further comprising a top plate attached to a top surface of the pair of blocks forming a cover for the pair of wedges and the symmetrically trapezoidal cavity.

14. The clamp bock of claim 10 further comprising a spreader block for attaching the clamp block to a fixed position.

15. The clamp block of claim 14 wherein the spreader block further comprises one or more shackles.

16. The clamp block of claim 10 further comprising an impact surface attached to each one of the wedges of the pair of wedges, the impact surface being perpendicular to a length of the semi-cylindrical void and designed to withstand blows from a hammer or mallet.

17. The clamp block of claim 10 wherein the clamp block is portable and weighs no more than 500 pounds.

18. A method of clamping a tensile implement using a clamp block comprising the steps of:
    a. providing the tensile implement to be clamped;
    b. providing the clamp block comprising
        i. an attachment point,
        ii. a grip base having a planar top surface,
        iii. a pair of grip blocks attached to the attachment point and to the grip base, each one of the blocks of the pair of blocks having a bottom surface that is substantially planar fixed to the grip base and also having an inner side surface that is perpendicular to the grip base and defined by a plane, the planes of the respective blocks intersecting at an acute angle,
        iv. a top plate attached to the pair of blocks, and
        v. a cavity between the inner surfaces of the pair of blocks;
    c. providing a plurality of pairs of wedges, each one of the wedges of each of the pairs of wedges of the plurality of wedges having i. a bottom surface that is planar and is in a sliding contact with the top surface of the grip base,
　　ii. an outer surface that is perpendicular to the grip base, is in sliding contact with the respective inner side surface of the blocks, and is defined by the plane that defines the inner surface of the blocks such that the wedges slide along the plane and are in sliding contact with the inner surface of the blocks, and
　　iii. an inner surface having a planar edge that is perpendicular to the grip base and a semi-cylindrical void wherein the planar edge and semi-cylindrical cavities of each wedge of any pair of the plurality of pairs of wedges are symmetrical and parallel such that when the planar edges of each wedge of any pair of wedges are in contact, each of the semi-cylindrical voids together form a cylindrical void;
d. providing a hammer or mallet capable of imparting blows onto the wedges;
e. measuring the diameter of the tensile implement;
f. selecting the pair of wedges from the plurality of pairs of wedges that has a cylindrical void diameter closest to the diameter of the tensile implement without being larger than the diameter of the tensile implement;
g. inserting the pair of wedges into the cavity between the inner surfaces of the pair of blocks;
h. placing the tensile implement into the cylindrical void of the pair of wedges; and
i. hammering each of the wedges of the pair of selected wedges with the hammer or mallet until the wedges securely envelop the tensile implement within the cylindrical void.

19. The method of clamping a tensile implement of claim 18 wherein the tensile implement provided in step a is selected from the group consisting of wires, cords, cables, ropes, chains, and wire ropes, wherein the tensile implement extends continuously through the cylindrical void.

20. The method of clamping a tensile implement of claim 19 wherein the diameter of the cylindrical void pair of wedges is no smaller than ⅛ inch and no larger than 1½ inches.

\* \* \* \* \*